United States Patent
Ketelsen

[11] 3,927,564
[45] Dec. 23, 1975

[54] VORTEX TYPE FLOWMETER
[75] Inventor: Broder Ketelsen, Settmarshausen, Germany
[73] Assignee: Fischer & Porter Co., Warminster, Pa.
[22] Filed: Jan. 24, 1974
[21] Appl. No.: 436,368

[30] Foreign Application Priority Data
Feb. 7, 1973 Germany.................. 2305813

[52] U.S. Cl................................. 73/194 B
[51] Int. Cl.² ............................. G01F 1/32
[58] Field of Search ................... 73/194 B

[56] References Cited
UNITED STATES PATENTS
3,116,639   1/1964   Bird ........................... 73/194
3,589,185   6/1971   Burgess ....................... 73/194

Primary Examiner—Herbert Goldstein

[57] ABSTRACT

A flowmeter operating on the Karman vortex principle to produce an output signal proportional to the mean velocity of the fluid passing through a flow conduit containing an obstacle assembly, the signal being independent of the velocity distribution of the fluid.

2 Claims, 4 Drawing Figures

VORTEX TYPE FLOWMETER

BACKGROUND OF THE INVENTION

The invention relates to a flow metering device in a conduit wherein gaseous and liquid fluids flow exhibiting an axially symmetrical velocity distribution, operating on the principle of the Karman vortex street. In such devices, an obstacle assembly is firmly attached within the tube, around which the fluid circulates, a sensor detecting the vortices flowing behind the obstacle. Already known as obstacle assemblies are diametrically opposed rod-shaped elements, transverse to the flow direction, in combination with temperature and pressure sensitive sensors.

The number of pulses passing the (circular) tube with the flowing fluid volume per unit time or, as is known, the pulse frequency of the vortices depends on the Reynolds number, such as to let the frequency first rise to a maximum with increasing Reynolds number, then let it fall again. This is known to be based on the fact that an axially symmetrical velocity distribution in a circular tube, i.e. an undisturbed flow results in a maximum flow velocity $v_{max}$ of the laminar flow in the conduit axis that is approximately double the average velocity $v_m$; then the hitherto laminar flow becomes turbulent at a critical Reynolds number (approx. 2300), whereby its axially symmetrical velocity distribution is altered to an extent where the $v_{max}/v_m$ ratio is reduced to a value between 1.4 and 1.1.

In the velocity ranges which are particularly favorable for the actual flow measurement, this velocity ratio $v_{max}/v_m$ lies within the range between 1.4 and 1.2.

In a flowmeter with a rod-shaped obstacle assembly, exhibiting a uniform profile across the whole length, the vortex frequency depends upon the flow velocity to be found around the obstacle assembly. In an axially symmetrical flow profile said obstacle assembly, however, is impinged with different flow velocities across the whole length of the assembly so that the shedding of the vortices occurs at the point of the highest flow velocity, thus initiating a vortex shedding across the whole length of the rod, whereby the vortex frequency, as the value to be measured, indicates the maximum flow velocity which will result in a faulty reproduction of the total flow volume at said velocity distribution.

As is generally known, there exists a circular zone in the axially symmetrical velocity distribution of a circular tube, wherein the local flow velocity $v$ is equal to the mean flow velocity $v_m$. The mean diameter $d$ of this circular zone is approximately 0.7 of the inner conduit diameter D and independent of the Reynolds number as well as of the type of flow (laminar or turbulent).

The frequency $f$ of the vortices flowing off, including the frequency of the measurement signals generated by the sensor not only depends on the flow velocity, but also on the effective width $b$ of the obstacle assembly as follows from the Strouhal number $S = f \cdot (b/v)$.

For a given Strouhal number $s$ the frequency $f$ remains constant at a certain axially symmetrical velocity distribution, if the $b/v$ ratio is constant. Actually, though, the velocity distribution within the conduit changes with the Reynolds number.

SUMMARY OF INVENTION

It is the main object of this invention to provide a flowmeter utilizing the effect of the Karman vortex streets in order to obtain a measured signal frequency proportional to the individual mean velocity of the flowing fluid and independent of the velocity distribution in all cases so as to accurately and efficiently measure the volume flow.

This object is accomplished in a flowmeter wherein the vortex shedding obstacle is either designed such that the shedding of the vortices is initiated at those points only, where the local flow velocity is equal to the mean flow velocity of the fluid, or, in case of a uniformly rod-shaped obstacle assembly such that with the width of the rod-shaped obstacle assembly, in perpendicular relation to the flow axis of the conduit, is increasing in size from the conduit walls to the conduit axis so that the ratio between the local flow velocity and pertinent width is practically constant at all points.

In the first case above the obstacle assembly is either constituted by an annular or at least a partly annular body, being maintained and spaced from the inner wall conduit by flat supporting strips in the wake of the assembly that do not cause vortex shedding or, is provided by a short obstacle assembly in the area of the circular zone only, where the mean flow velocity corresponds to the local flow velocity.

In the second said case the use of rod-shaped obstacle assemblies, extending across the whole conduit diameter, assures shedding of vortices even at changing velocity distribution in those points, where the mean velocity corresponds to the local flow velocity, by providing the conditions for a shedding of vortices in all points of the obstacle assembly through a frequency that is proportional to the mean velocity.

OUTLINE OF THE DRAWING

For a better understanding of the invention, reference is made to the following description to be read in conjunction with the annexed drawing wherein.

DESCRIPTION OF INVENTION

Figure 1:
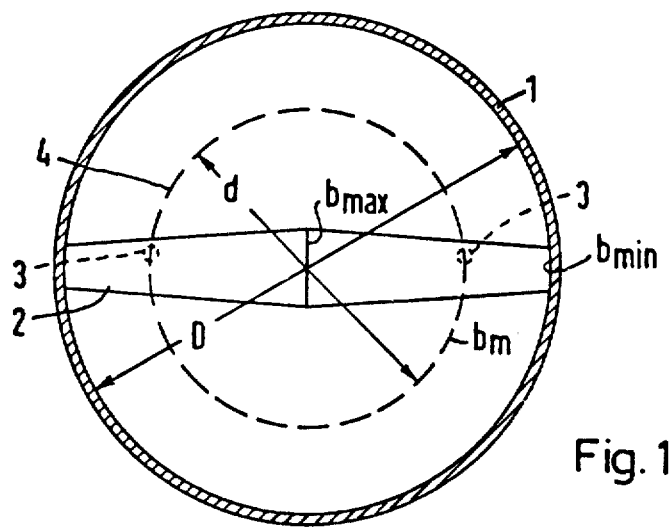
FIG. 1 is a cross section of a circular conduit of a flowmeter having one preferred embodiment of an obstacle assembly in accordance with the invention.
Figure 2A:
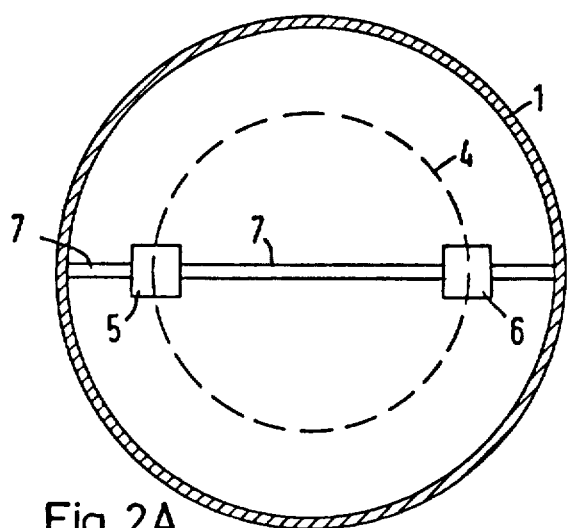
FIG. 2A is a cross-section of a circular conduit provided with another preferred embodiment of an obstacle assembly.
Figure 2B:
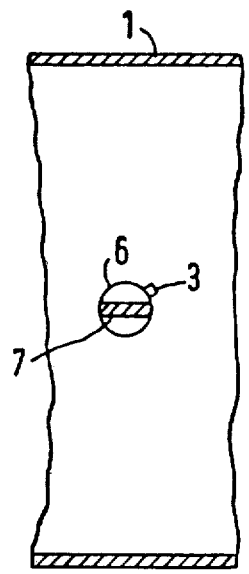
FIG. 2B is a longitudinal section taken of FIG. 2A.

Element 1 is a circular flow conduit with axially symmetrical velocity distribution of the flowing fluid. Element 2 is a rod-shaped obstacle assembly having a circular cross section, for instance, perpendicular to the conduit axis and extending diametrically into the inner conduit. Elements 3 are the sensors for shedding of the vortices, arranged as is known on the obstacle assembly.

As seen in the flow direction, the sensors can either be mounted before or behind or directly on the obstacle assembly, while they should be in the area of the circular zone 4, wherein the local velocity is equal to the mean flow velocity $v_m$. The mean diameter ratio $d$ of the circular zone 4 to the inner diameter D of the conduit 1 is $d = 0.7\ D$.

The width $b$ of the obstacle assembly 2 facing the flow exhibits a maximum $b_{max}$ in the center of the conduit and a minimum $b_{min}$ at the conduit walls. In the area of the circular zone 4 this width is $b_m$, while the value $b_{max}/b_m$ should be between 1.3 and 1.1.

At a $b_{min}/b_{max}$ ratio of 0.81 to 0.87 and $v_{max}/v_m = 1.2$ a frequency $f$ of the measured signals, proportional to the mean flow velocity $v_m$, can be obtained.

The obstacle assembly in accordance with 2A and 2B is constituted by the sectional assemblies 5 and 6 in the area of the circular zone 4, connected to the conduit and to each other by flat connection strips 7. The sensors 3 are attached to the obstacle assembly or firmly arranged behind them.

Figure 3:
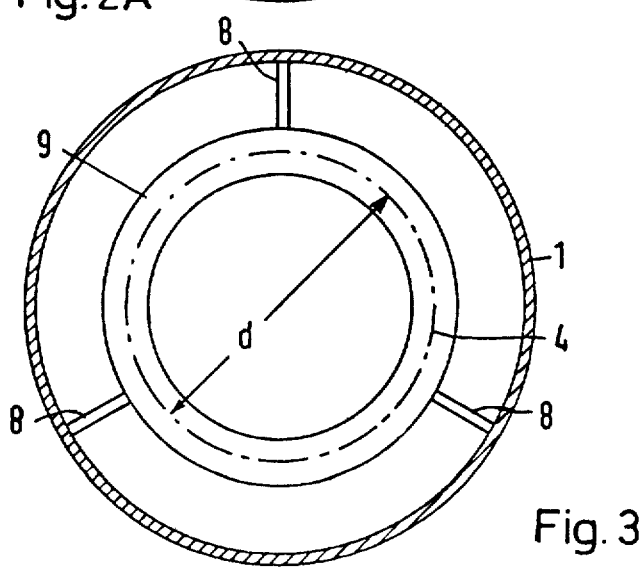
FIG. 3 is a cross-section of still another embodiment of an obstacle assembly.

In FIG. 3 the obstacle assembly 9 is constituted by a ring having any cross section, the mean diameter of which is equal to the mean diameter of the circular zone 4, the ring being maintained to the conduit 1 by flat supporting rods.

I claim:

1. A flowmeter of the type operating on the principle of Karman's vortex streets, comprising a flow conduit through which gaseous or liquid fluids to be measured are conducted with an axially symmetrical velocity distribution; an obstacle assembly fixedly disposed in said conduit around which the fluid circulates to shed vortex streets, and a sensor to detect the shedding vortices, said vortex shedding obstacle assembly being positioned in said conduit and shaped to initiate vortex shedding in those points only where the local flow velocity is equal to the mean velocity of the flowing fluid.

2. A flowmeter as set forth in claim 1 wherein said obstacle assembly is constituted by a flat body whose edge faces the intake flow and is sufficiently thin as not to shed vortices, said body being perpendicular to the flow direction within said conduit, said body having a pair of vortex shedding elements mounted thereon at spaced positions to intersect a circular zone within the conduit wherein the local flow velocity is equal to the mean flow velocity.

* * * * *